(12) United States Patent
Plagemann et al.

(10) Patent No.: US 9,063,573 B2
(45) Date of Patent: Jun. 23, 2015

(54) METHOD AND SYSTEM FOR TOUCH-FREE CONTROL OF DEVICES

(75) Inventors: Christian Plagemann, Menlo Park, CA (US); Hendrik Dahlkamp, Palo Alto, CA (US); Hariraam Varun Ganapathi, Palo Alto, CA (US); Sebastian Thrun, Los Altos Hills, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 599 days.

(21) Appl. No.: 13/030,071

(22) Filed: Feb. 17, 2011

(65) Prior Publication Data

US 2012/0212413 A1 Aug. 23, 2012

(51) Int. Cl.
*G09G 5/08* (2006.01)
*G06F 3/01* (2006.01)
*G06F 3/00* (2006.01)

(52) U.S. Cl.
CPC ............... *G06F 3/017* (2013.01); *G06F 3/005* (2013.01)

(58) Field of Classification Search
CPC .................................. G06F 3/017; G06F 3/005
USPC ................................................... 345/156–158
See application file for complete search history.

(56) References Cited

U.S. PATENT DOCUMENTS

| 2005/0129273 | A1* | 6/2005 | Pryor | 382/103 |
| 2006/0202953 | A1* | 9/2006 | Pryor et al. | 345/156 |
| 2011/0267265 | A1* | 11/2011 | Stinson | 345/157 |

* cited by examiner

*Primary Examiner* — Amare Mengistu
*Assistant Examiner* — Jennifer Zubajlo
(74) *Attorney, Agent, or Firm* — Guadalupe M. Garcia

(57) ABSTRACT

The present invention provides a system and computerized method for receiving image information and translating it to computer inputs. In an embodiment of the invention, image information is received for a predetermined action space to identify an active body part. From such image information, depth information is extracted to interpret the actions of the active body part. Predetermined gestures can then be identified to provide input to a computer. For example, gestures that can be interpreted to mimic computerized touchscreen operation. Also, touchpad or mouse operations can be mimicked.

28 Claims, 9 Drawing Sheets

METHOD AND SYSTEM FOR TOUCH-FREE CONTROL OF DEVICES

STATEMENT OF GOVERNMENT SPONSORED SUPPORT

This invention was made with Government support under contract N00014-07-1-0747-P00004 awarded by the Office of Naval Research. The Government has certain rights in this invention.

FIELD OF THE INVENTION

The present invention generally relates to the field of image processing and user interfaces. More particularly, the present invention relates to interpreting visual cues such as depth cues from image information.

BACKGROUND OF THE INVENTION

In many situations, the human experience is a three-dimensional one where body gestures play an important role. From an early age, children learn to interpret three-dimensional gestures that become fully engrained in an adult. Grabbing and moving actions are natural to a human.

To the extent that modern human experience requires much use of computers, such computers are currently not designed to interpret these natural gestures. Instead, special input devices including mice, trackpads, and keyboards have been used, which do not lend themselves to direct and natural interaction with digital content.

Where other input devices have been developed to allow for the input of natural human gestures, an attached apparatus has been necessary. For example, grabbing and moving actions have required the use of specialized gloves or hand attachments that then require less-than-natural movements to utilize.

The present invention is directed to, among other things, allowing a user to provide input to a computer using natural gestures without need for an attached device. The present invention is also directed to providing standard computer inputs without need for contact to input devices such as mice, touchpads, or keyboards.

SUMMARY OF THE INVENTION

The present invention provides a system and computerized method for receiving image information and translating it to computer inputs. In an embodiment of the invention, image information is received for a predetermined action space to identify an active body part. From such image information, depth information is extracted to interpret the actions of the active body part. Predetermined gestures can then be identified to provide input to a computer. For example, gestures that can be interpreted to mimic computerized touchscreen operation. Also, touchpad or mouse operations can be mimicked.

In other embodiments, gestures beyond standard computer inputs can be identified. For example, grab and move hand gestures can be used to provide input to a computer. Other gestures can also be identified by making use of the depth information from active parts.

In an embodiment, the active part can be an object such as sporting equipment, props, or other objects from which depth cue and movement operation can be used to provide computer input. Such an embodiment can be used in gaming applications.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

DETAILED DESCRIPTION OF THE INVENTION

Figure 1:
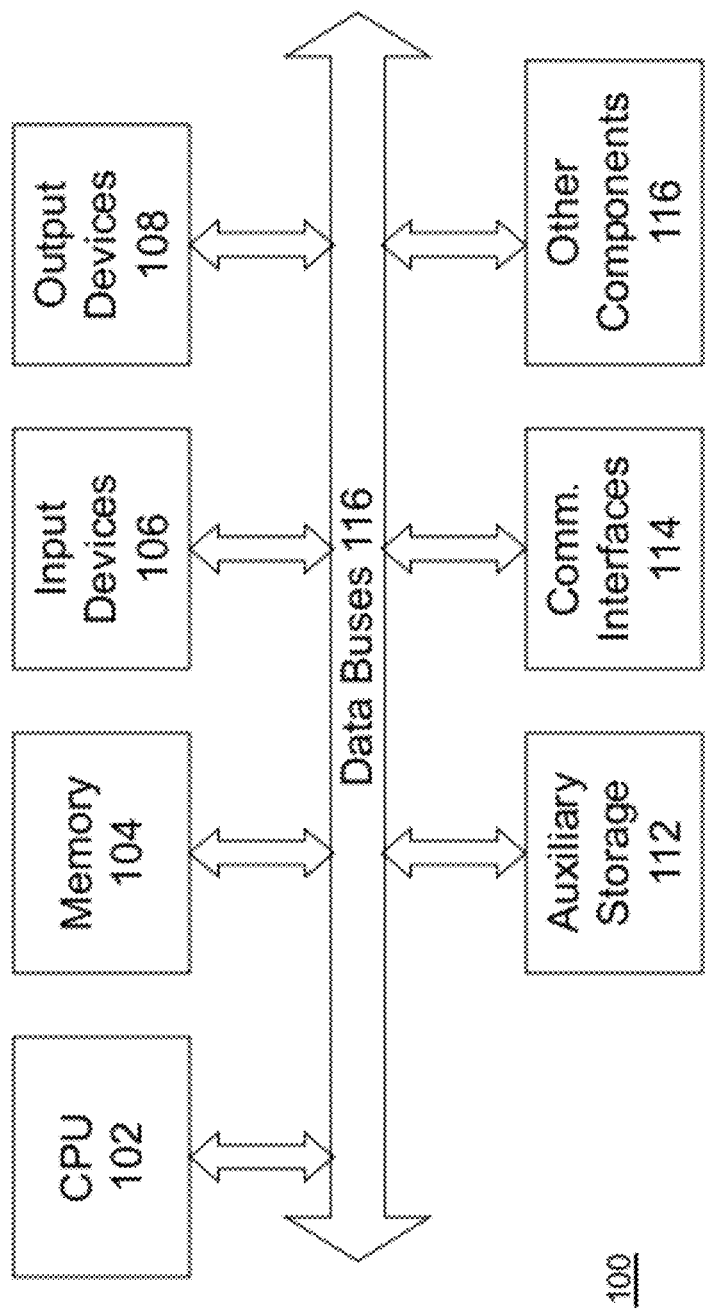
FIG. 1 is a block diagram of a computer system on which the present invention can be implemented.

Among other things, the present invention relates to methods, techniques, and algorithms that are intended to be implemented in a digital computer system 100 such as generally shown in FIG. 1. Such a digital computer is well-known in the art and may include the following.

Computer system 100 may include at least one central processing unit 102 but may include many processors or processing cores. Computer system 100 may further include memory 104 in different forms such as RAM, ROM, hard disk, optical drives, and removable drives that may further include drive controllers and other hardware. Auxiliary storage 112 may also be include that can be similar to memory 104 but may be more remotely incorporated such as in a distributed computer system with distributed memory capabilities.

Computer system 100 may further include at least one output device 108 such as a display unit, video hardware, or other peripherals (e.g., printer). At least one input device 106 may also be included in computer system 100 that may include a pointing device (e.g., mouse), a text input device (e.g., keyboard), or touch screen.

Communications interfaces 114 also form an important aspect of computer system 100 especially where computer system 100 is deployed as a distributed computer system. Computer interfaces 114 may include LAN network adapters, WAN network adapters, wireless interfaces, Bluetooth interfaces, modems and other networking interfaces as currently available and as may be developed in the future.

Computer system 100 may further include other components 116 that may be generally available components as well as specially developed components for implementation of the present invention. Importantly, computer system 100 incorporates various data buses 116 that are intended to allow for communication of the various components of computer system 100. Data buses 116 include, for example, input/output buses and bus controllers.

Indeed, the present invention is not limited to computer system 100 as known at the time of the invention. Instead, the present invention is intended to be deployed in future computer systems with more advanced technology that can make use of all aspects of the present invention. It is expected that computer technology will continue to advance but one of ordinary skill in the art will be able to take the present disclosure and implement the described teachings on the more advanced computers or other digital devices such as mobile telephones or "smart" televisions as they become available. Moreover, the present invention may be implemented on one or more distributed computers. Still further, the present invention may be implemented in various types of software languages including C, C++, and others. Also, one of ordinary skill in the art is familiar with compiling software source code into executable software that may be stored in various forms and in various media (e.g., magnetic, optical, solid state, etc.). One of ordinary skill in the art is familiar with the use of computers and software languages and, with an understanding of the present disclosure, will be able to implement the present teachings for use on a wide variety of computers.

The present disclosure provides a detailed explanation of the present invention with detailed explanations that allow one of ordinary skill in the art to implement the present invention into a computerized method. Certain of these and other details are not included in the present disclosure so as not to detract from the teachings presented herein but it is understood that one of ordinary skill in the at would be familiar with such details.

The present invention makes use of digitized image and video information that can be captured in various ways so as to extract depth cues. For example, specialized cameras can be implemented that are designed to capture depth cues from body image information. Also, more general cameras, including web cameras, stereo cameras, and time-of-flight devices, can be used to capture body image information where such information is then used to generate depth cues. Still other types of cameras can be used to capture, for example, infrared image information. Still other image information can be captured using time-of-flight cameras that use specialized lasers to capture depth information for body images such as from information about the size of body parts.

Figure 2:
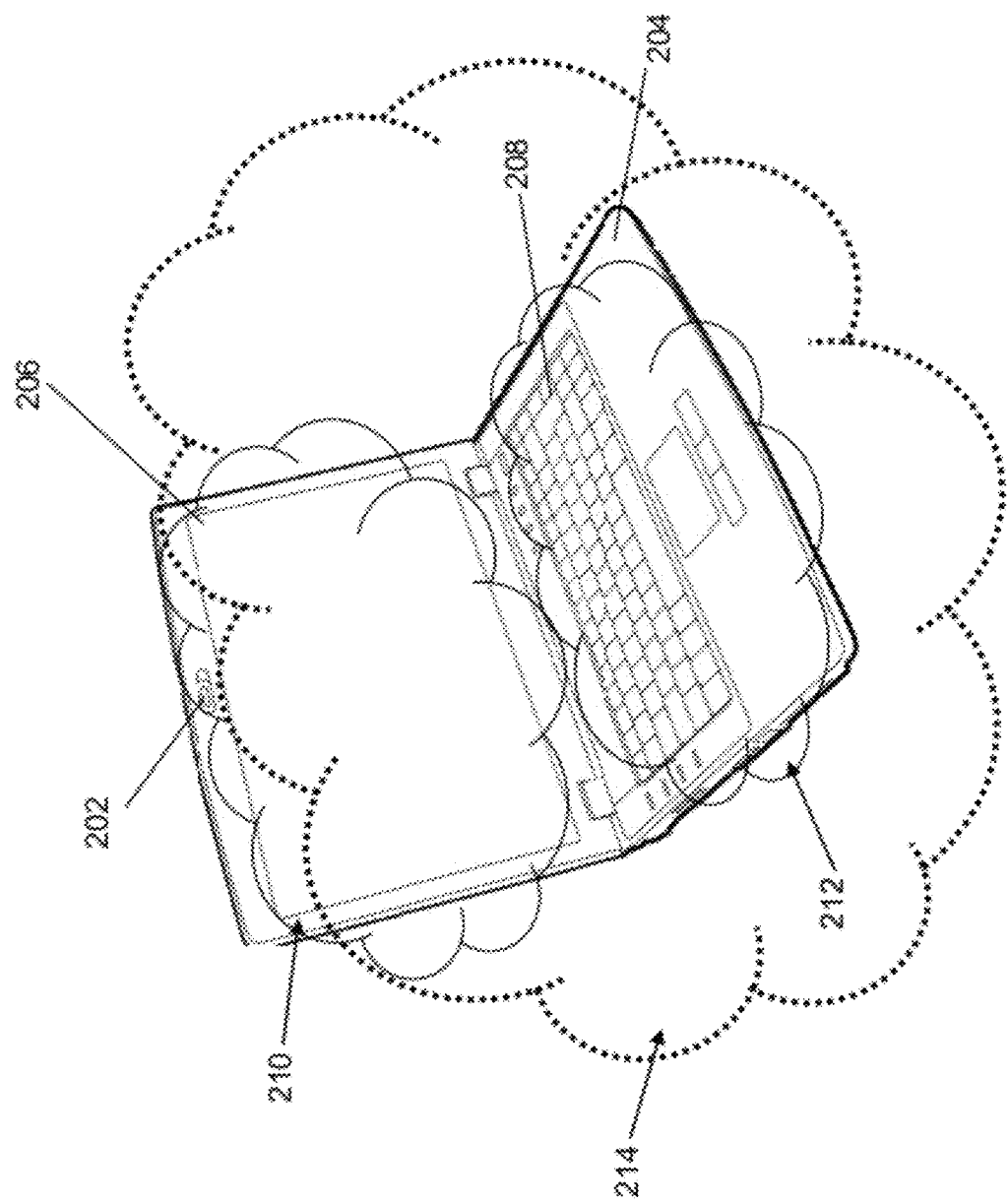
FIG. 2 is an image of a portable computer and a depiction of various actions spaces relative to the computer.

In one embodiment of the invention, a webcam is used for image input information. Multiple frames of the webcam image information are used to generate depth cues to be used according to the present invention. A webcam provides several advantages including its low cost as well as its wide application in modern computers. For example, as shown in FIG. 2, a webcam 202 as may be preinstalled in a laptop computer 204 may be used. An issue with the use of a webcam on a portable computer 204 is that its field of view may be fixed based on the position of the display 206.

For example webcam 202 is generally positioned by the position of display 206 that is set for a desirable viewing angle by a user. In providing a desirable viewing angle for display 206, webcam 202 is also generally positioned to capture certain actions performed by the user. For example, in such a position, webcam 202 is able to capture body position information directly in front of display 206. This can be appropriate when it is desired to capture gesture and other information from user 208 in an action space 214 in front of display webcam 202 at a distance of approximately several feet. If information from a different action space is desired to be captured, webcam 202 of computer 204 may not be properly positioned. For example webcam 202 is not able to capture information from action space 212 that is directly above the keyboard 208 or in action space 210 that is directly in front of display 206. One manner of addressing this issue is to use multiple cameras directed at different actions spaces.

Figure 3:
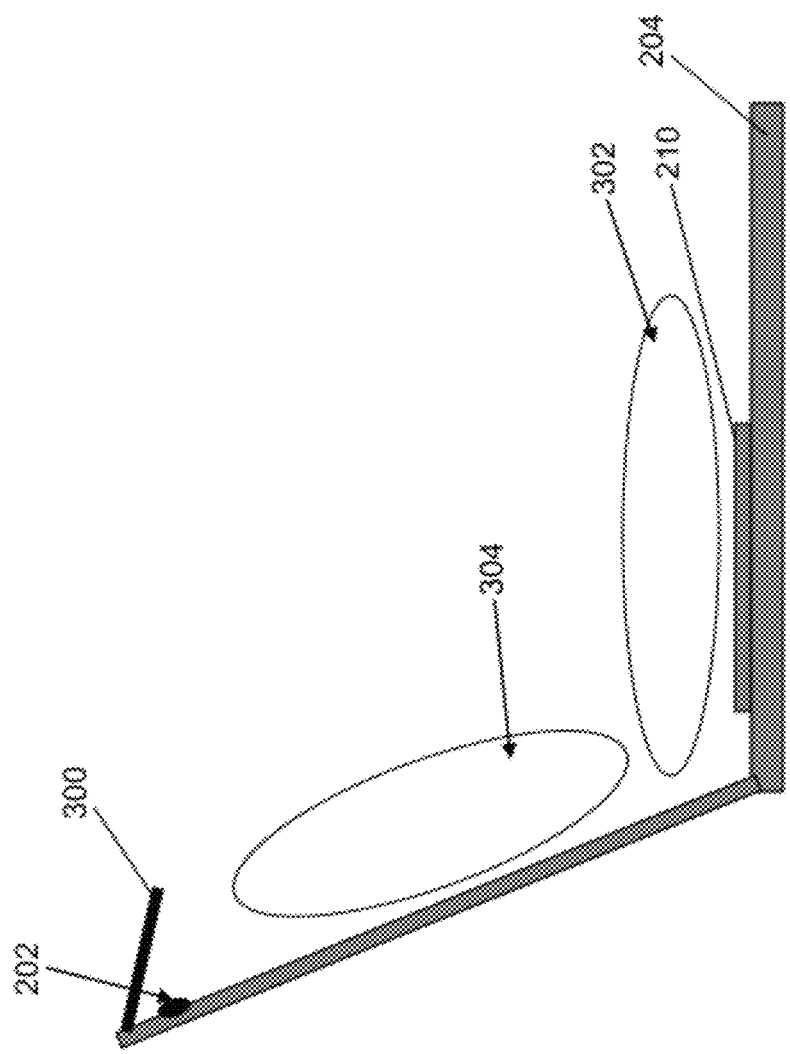
FIG. 3 is an image of a portable computer and a depiction of various actions spaces relative to the computer.

Another manner of addressing this issue according to an embodiment of the invention is to use a light bending apparatus 300 of FIG. 3 that is positioned around or near webcam 202 so as to reflect images from the appropriate action space. For example, as shown in FIG. 3, reflecting apparatus 300 is positioned in front of webcam 202 so as to capture image information from action space 302 that is directly above keyboard 210 of computer 204. Where it may be desirable to capture image information from another action space, e.g., action space 304 directly in front of display 206, mirrored apparatus 300 can be repositioned to capture such image information.

As shown in FIG. 3, light-bending apparatus 300 makes use of a mirror so as to redirect image information from action spaces of interest to webcam 202. In other embodiments, light-bending apparatus 300 can be implemented using other methods of bending light such as through the use of prisms or fiber optic cables. These and other methods of bending light are known to those of skill in the art and their implementation does not deviate from the present invention.

Figure 4:
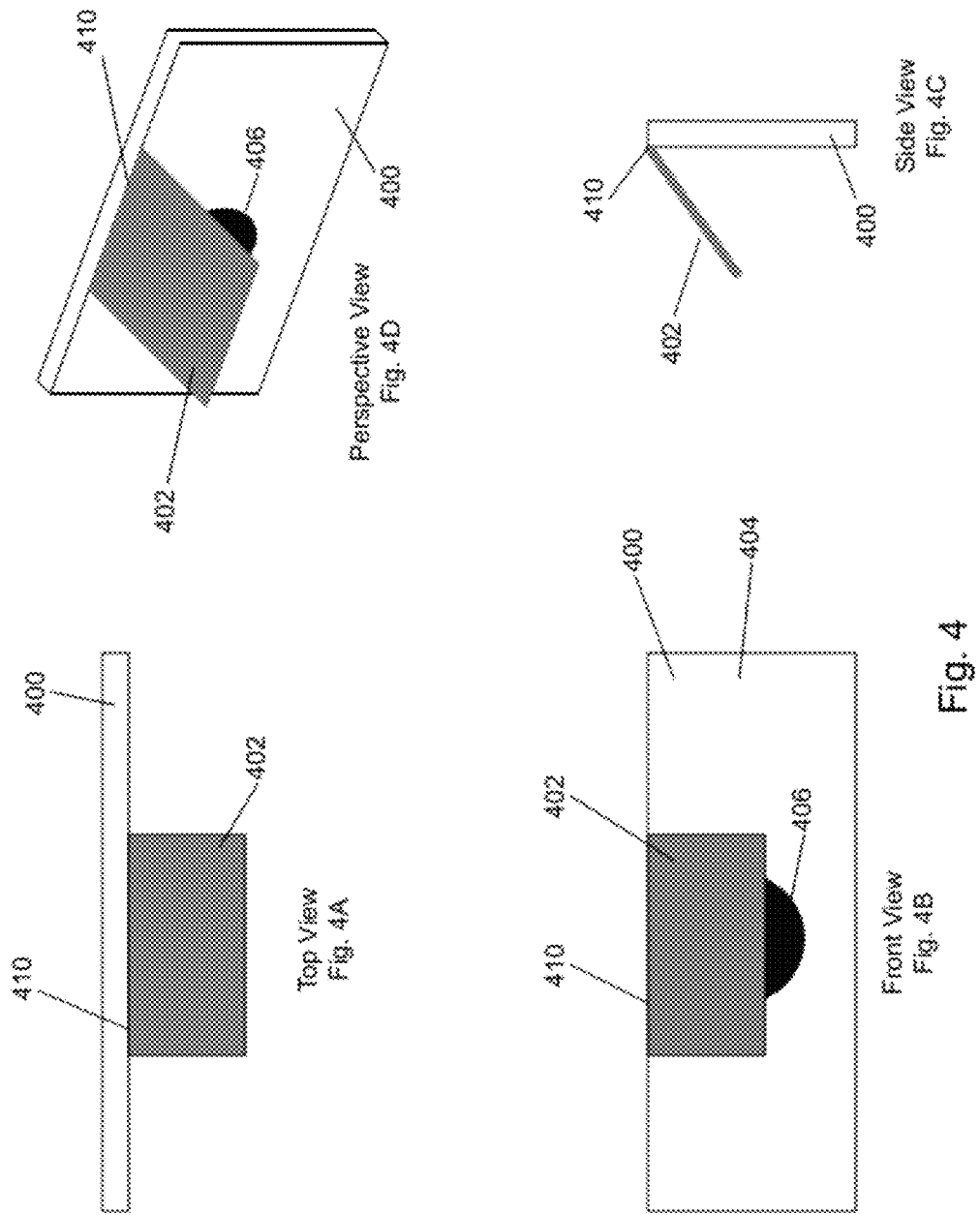
FIG. 4 shows various perspectives of an image bending apparatus according to an embodiment of the invention.

Shown in FIG. 4 is a more detailed view of an implementation of light-bending apparatus 400 as implemented with a mirror 402. As shown, light-bending apparatus 400 includes a base 404 that is configured to be mounted on or around webcam 406 on a computer body (not shown). For example, base 404 may be permanently glued to the computer body. In another embodiment, hook and loop fasteners are used to provide a light-bending apparatus. Reflecting apparatus 400 includes mirror 408 that is connected to base 404 by hinge 410. Mirror 408 can, therefore, be positioned to capture image information from a desired action space such as discussed above.

Figure 5:
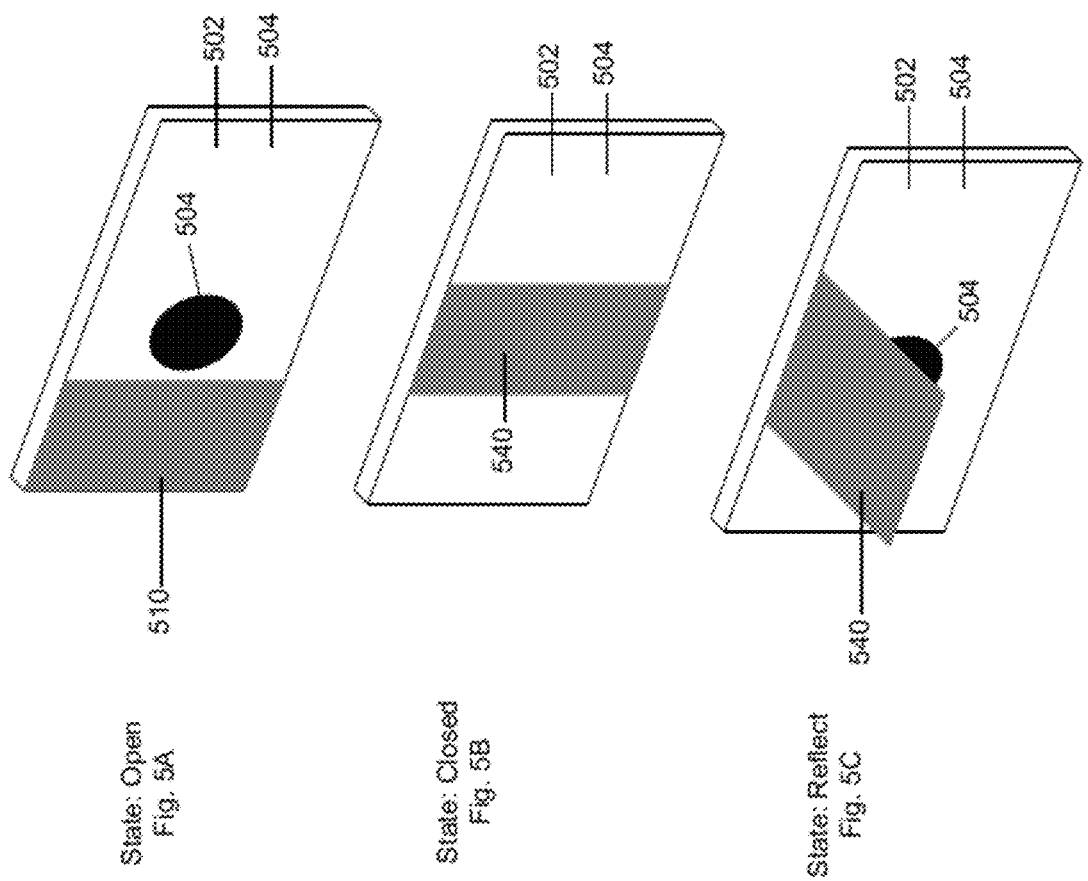
FIG. 5 shows various states of an image bending apparatus according to an embodiment of the invention.

Another embodiment of the invention is shown in FIG. 5. As shown in FIG. 5, light-bending apparatus 502 is similar to reflecting apparatus 400 with some notable enhancements. As shown in FIG. 5, light-bending apparatus 502 includes a base 504 that allows mirror 310 to be slid into multiple positions. For example, as shown in FIG. 5, three states are available: open as shown in FIG. 5A, closed as shown in FIG. 5B, and reflect as shown in FIG. 5 C. More specifically, as shown in FIG. 5A an open state is shown with mirror 504 positioned to the side of camera 504 such that the reflecting qualities of mirror 504 is not used. As shown in FIG. 5B a closed state is shown with mirror 504 positioned in front of camera 504 and in a down position such that mirror 504 prevents camera 504 from receiving image information. As shown in FIG. 5C a reflect state is shown with mirror 504 positioned in front of camera 504 so as to capture image information from an action space of interest as discussed above. For example, in a reflecting position, light-bending apparatus 502 can reflect image information from an action space directly above the keyboard.

In an embodiment, light-bending apparatus 502 provides position information that can be used by methods of the present invention. Position information can be provided by, for example, switches or latches that respond to the position of mirror 504.

Figure 6:
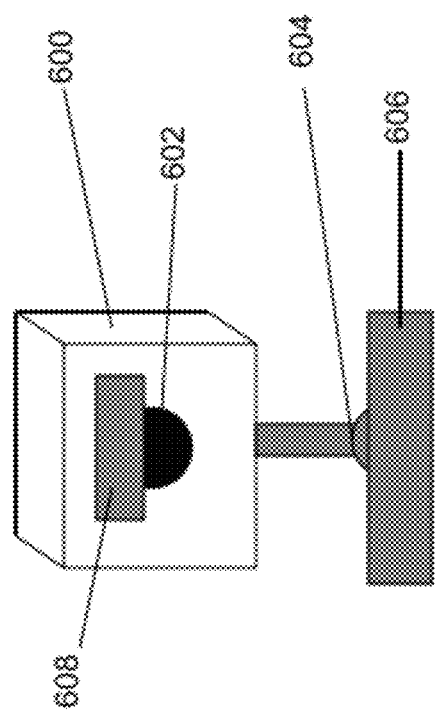
FIG. 6 shows a web cam that includes an mage bending apparatus according to an embodiment of the invention.

In an embodiment of the invention, a stand-alone webcam 600 as shown in FIG. 6 is used that is mounted on a swivel base 604. Swivel base 604 allows stand-alone webcam 600 to be position as desired so as to capture appropriate action space information. In yet another embodiment, stand-alone webcam 600 is further configured with reflecting apparatus 608. In such an embodiment, stand-alone webcam 600 may or may not have a swivel base but because of the functionality of light-bending apparatus 600, a broad field of view is available to capture action spaces of interest.

In still another embodiment of the invention, a specialized depth camera may be used. Such a depth camera may be for example a time-of-flight camera that uses at least one infrared laser to determine depth of field information. In another embodiment of the invention, a stereoscopic camera may be used. Such a camera uses two cameras separated by a predetermined distance that are used to provide slightly different image input from which three-dimensional depth of field information can be obtained.

It should be noted that where the light-bending apparatus implements a mirror, the captured image information is a mirror image. In an embodiment of the invention, mirror image information is transformed to corrected-image information before other algorithms are implemented. In another embodiment of the invention, mirror image information is not converted and algorithms of the present invention account for such mirror image information.

According to the present invention, various other coordinate transformations can be implemented. For example, an embodiment of the invention can implement fixed positioning where an action space includes fixed mapping between a calibrated action space and inputs to the present invention. For example, where action space 210 above display 206 of FIG. 2 is used, fixed areas of display 206 correspond to predetermined inputs to the system so as to mimic a touchscreen. For a touchscreen-like implementation, a direct transformation system can also be used that maps a Cartesian space in the real world to Cartesian display coordinates. Indirect fixed transformations can also be used to translate from a curved or spherical real world space to a fixed Cartesian space. Adaptive versions of these algorithms that adapt to changing user behavior are also possible.

In another embodiment of the invention, adaptive positioning is implemented. In this embodiment, the present invention adapts to inputs and maps such inputs to a fixed input. For example, in mimicking a keyboard on a table top, the present invention receives image input for the hands and fingers of a user's hand and maps their movement to a keyboard to provide input to the system. The present invention can adapt to other inputs including mouse-like or trackpad-like movements.

In another embodiment of the invention, relative positioning is used such as implemented in mouse inputs that make use of, for example, forwarding of velocities or acceleration instead of fixed positions.

In various embodiments of the invention, different action spaces are used where an action space is generally a space where actions are expected to occur. Actions of interest can include hand and finger gestures as well as movements of other body parts. The present invention makes use of image information from the action space of interest to generate depth cues to interpret the actions of interest.

In an embodiment of the invention, the action space can include the area directly near a screen of a computer such as action space 210 of FIG. 2. In this embodiment, the user touches different areas of the computer screen that are received by the image input device and translated as input to the system of the present invention. In this way, the present invention provides functionality similar to functionality provided by a touch-sensitive screen, sometimes also called touch screen.

Figure 7:
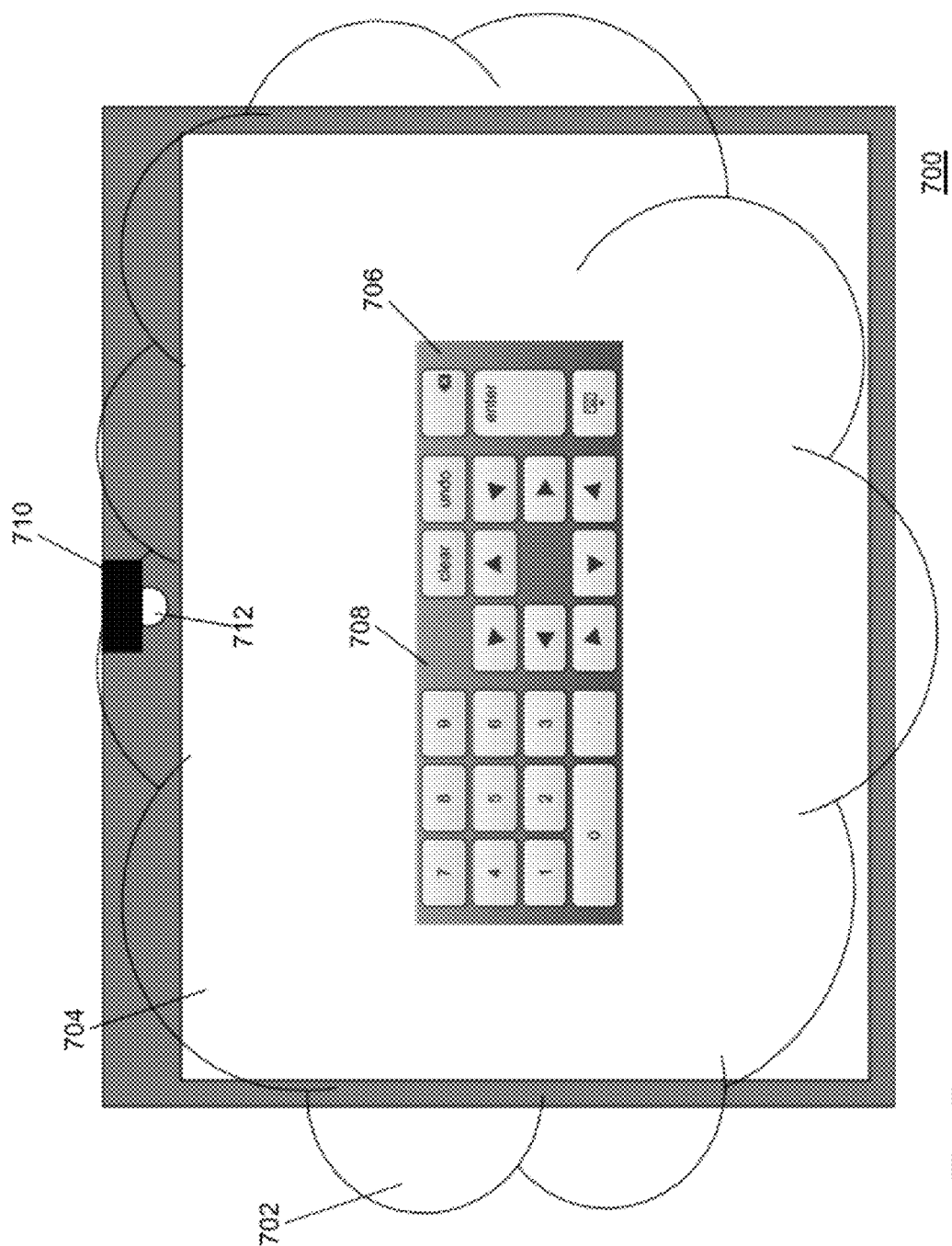
FIG. 7 shows a computer display and an action space according to an embodiment of the invention.

System 700 as shown in FIG. 7 is exemplary. As shown, a user may be presented with an image 706 on computer display 704 to which a user will respond. For example, as shown, image 706 is in the form of a number keypad 708. A user can then be prompted to, for example, touch the screen so as to enter a telephone number or other numeric information. Although the user would respond by touching areas of image 706, the screen 704 need not be touch-sensitive. The system of the present invention can collect image information from action space 702 so as to respond appropriately. For example, in an embodiment of the invention, a finger tip is an action body part to which the invention responds. By capturing image information from action space 702 that provides image 706 with an opportunity to make appropriate movements. The user can then touch the screen where the image 706 appears.

An image input device as discussed previously, in this case a camera, receives input information that detects the presence of an action body part that has been predetermined to be an input point and further detects actions of the action body part corresponding to a pressing, selection, or activation action. System 700, therefore, translates the actions of the user's forefinger as a touchscreen operation and further determines a mapping that determines the desired action by the user, in this case, selection of certain numbers on a keypad.

Many more possibilities are available through the use of the present invention. In fact, essentially all mouse input actions can be provided the touchscreen mode of the present invention. For example, click and drag operations are available where the system of the present invention detects a press down action of a user's finger on the virtual touchscreen of FIG. 7 and then detects a dragging operation across the screen. Notably, the present invention, detects these actions through the image input device and not necessarily input information from a conventional touchscreen with touch sensors (e.g., capacitive sensors) on the screen.

In another embodiment of the invention, the action space includes hovering over a computer display without need to actually touch the display. In this embodiment, rather than a user touching the computer display, the user instead hovers over the display and performs essentially the same actions of the virtual touchscreen embodiment except that it is not necessary to touch the display. This embodiment can be desirable because it avoids blemishing the computer display with oils or soil that may be present on a user's hand. Also, this embodiment may be desirable so as to avoid physical damage to a computer display.

In this embodiment, the system of the present invention translates an action space 710 that is a predetermined distance above the computer display into an action space.

In another embodiment of the invention, the action space of interest can be action space 212 above keyboard 208 as shown in FIG. 2. From action space 212, the present invention makes use of information relating to a user's hands or fingers so as to generate input to a computer including but not limited to mouse-like inputs. In making use of action space 212, the space above keyboard 208 can be used but inputs from the keyboard can also be used. For example, the present invention can make use of the position of a user's forefinger and can further detect that the forefinger is making a downward motion. Such downward motion can also be detected by keyboard 208 as the pressing of certain keys. The pressing of keys can also serve to calibrate the detected position of the user's forefinger or other body part. In this embodiment, the movements and actions are similar to those used for a traditional touchpad where a user can move his forefinger in action space 212 for touchpad movement operations and can further make up-and-down finger motions for clicking operations. Many more operations, however, are possible.

In another embodiment of the invention, an action space can be a space over any other object including, for example, a table top. Touchpad-like operations as described above can be made without need for direct input to a computer. In yet another embodiment of the invention, finger positions are detected in such an action space to mimic a keyboard. In such an embodiment, a user can make keyboard movements such as would be performed on a QWERTY keyboard to provide input to a computer. A template could be used with an outline of a keyboard but the present invention does not require such a template.

In another embodiment of the invention, action space 214 between the user and the computer 204 of FIG. 2 is used. In this embodiment, a user's fingers, hands, head position, or other position information are detected so as to provide a wide variety of input signals. Conventional mouse input signals are available in this embodiment but so are many more types of input signals. For example, with the general position of a user's hands available as input, common hand movements can be interpreted as input. For example, hand and arm positions can be detected to provide grabbing and moving actions. Such an embodiment can be used in computerized game applications for example.

Along with body part detection, other objects can also be detected. For example, in gaming applications, sports equipment or props can be detected, including tennis rackets, bats, mitts, balls, etc. Also, in a writing application, the position of a pen, for example, can be detected as text or signature input.

Other hand information can also be made available including the back or palm position of a user's hand. Also, the position of a user's primary input finger (e.g., forefinger) is available. Still further, the position of each of a user's fingers can be tracked and used as input.

The input system of the present invention can be used as a replacement for conventional input devices but can also be used in connection with and as a supplement to conventional input devices. For example, in an embodiment of the invention, key strokes, mouse movements, and clicks can be used to turn on features of the present invention. In an embodiment, a combination of keystrokes is used to initiate operation of the present invention. In another embodiment, menu selections and mouse clicks are used to initiate operation of the present invention.

Figure 8:
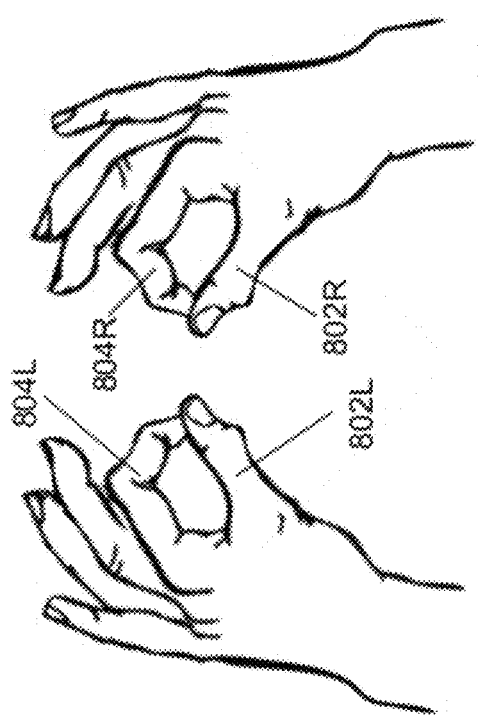
FIG. 8 shows hand gestures to initiate certain operations according to an embodiment of the invention.

In yet another embodiment of the present invention, the system is initiated by performing predetermined actions. For example, the system of the present invention can be initiated as shown in FIG. 8 when a user touches his thumb 802L to his forefinger 804L while simultaneously touching his thumb 802R to his forefinger 804R. These finger motions provide an affirmative signal to the present invention that features of the present invention should be initiated. It is important to note that in this embodiment of the invention, the system of the present invention is operable before the user touches his fingers together, but the system may not be in full operation to provide predetermined inputs to the computer system (e.g., mouse clicks, drag and drop, etc.). The system is at least operable to detect the presence of the initiation signal (e.g., touching thumbs and forefingers together).

Figure 9:
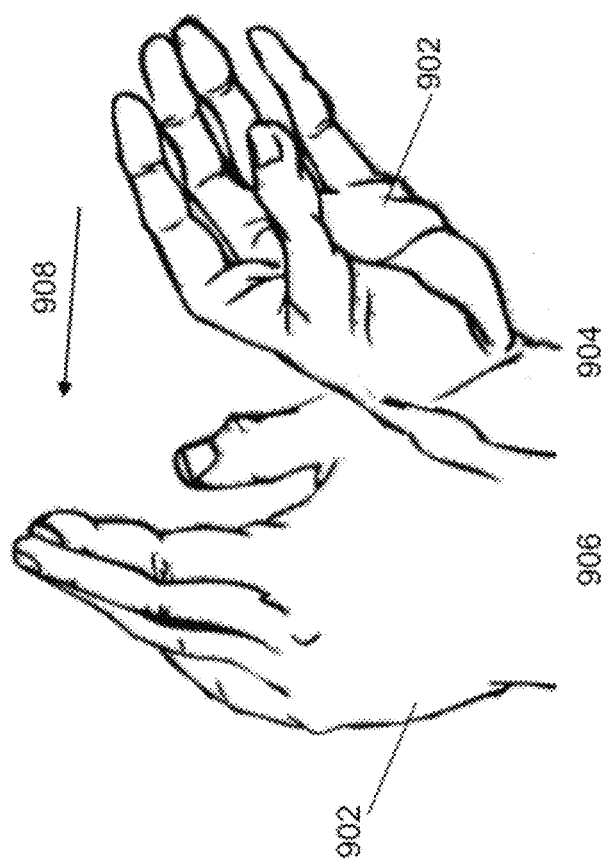
FIG. 9 shows a hand gesture to initiate certain operations according to an embodiment of the invention.

FIG. 9 demonstrates another gesture that can be used to initiate the system of the present invention. As shown, a user's hand 902 performs a flicking operation by moving from a position 904 to a position 906 as indicated by arrow 908. In another embodiment of the invention, two-hand flicking, hand swipes, or finger motions are used to initiate operation of the system. In an embodiment of the invention, gestures used to initiate the system of the present invention are selected as generally unusual gestures that are not common during the use of a computer system so as not to inadvertently initiate the system.

In an embodiment of the invention, the system of the present invention identifies an active part of a user's body. For example, an active part can be the user's forefinger 806 or the tip of the user's forefinger 808 as shown in FIG. 8. In other embodiments of the present invention, an active part can be more than one of a user's fingers, at least one of user's hand 902 as shown in FIG. 9, and can even include the arms, shoulders, and head, or eyes of a user.

In an embodiment of the invention where the position of a user's forefinger 808 (FIG. 8) is the active part, it can be necessary to identify the palm 910 (FIG. 9) and backside 912 (FIG. 9) of a user's hands. In this embodiment, the skin color of the hand is tracked and the shades of a user's palm and backside can be learned in a computerized method.

In another embodiment of the invention, a background subtraction algorithm is used to identify a user's hands. In this embodiment, a background is identified that is known to be in the absence of a user's hands. Upon detection of a user's hands, the algorithm performs a background subtraction to identify the changing position of a user's arms, hands, and fingers. In another embodiment, a change detection algorithm is implemented to detect the presence of moving and stationary objects. From identified moving objects, the position of a user's arms, hands, and fingers can be determined.

In an embodiment of the invention, a primary active part is a user's forefinger tip 808 (FIG. 8). Various algorithms are available for determination of a user's fingertip. For example, shape and appearance descriptors can be used to identify the fingertip of interest. A sliding window detector or a voting-based identification algorithm can also be used.

In an embodiment of the present invention, it is necessary to track active parts of user's body or other objects. Depth cues from the tracked parts can then be used to interpret the actions in the action space of interest. Tracking can be achieved using several algorithms. For example, tracking can be performed using an optical flow algorithm. Using such an algorithm, the movement of an active part of a user, for example, a fingertip, can be followed across an action space. In another embodiment of the invention, a multi-hypothesis algorithm is used to track active parts of a user's body.

In still another embodiment of the invention, a model-based tracking algorithm is implemented. In such an embodiment, a three- or two-dimensional model of active parts of a user's body, for example, are developed in a depth image using the image input signal. An iterative closest point algorithm can also be used for this purpose.

In the present invention, it is necessary to identify an active part, for example, a fingertip, in an action space. Various algorithms are available for this purpose.

For example, an algorithm for color-based tracking under varying illumination can be used for real-time skin segmentation in video sequences. The skin segments can include the skin of a fingertip, finger, hand, palm, arm, etc. This algorithm enables reliable skin segmentation despite wide variation in illumination during tracking and localization.

In this algorithm, an explicit second order Markov model is used to predict evolution of the skin color histogram over time. Histograms are dynamically updated based on feedback from the current segmentation and based on predictions of the Markov model. The evolution of the skin color distribution at each frame is parameterized by translation, scaling and rotation in color space. Consequent changes in geometric parameterization of the distribution are propagated by warping and re-sampling the histogram. The parameters of the discrete-time dynamic Markov model are estimated using Maximum Likelihood Estimation, and also evolve over time. Quantitative evaluation of the method has been conducted on labeled ground-truth video sequences taken from popular movies.

Multiple hypothesis tracking for multiple target tracking can also be used for active part localization. In this algorithm, the target tracking objective is to collect image data from a field of view containing one or more potential targets of interest (e.g., active part) and to then partition the image data into sets of observations, or tracks that are produced by the same object (or target). The term target is used in a general sense.

Once tracks are formed and confined (so that background and other false targets are reduced), the number of targets of interest can be estimated and quantities such as target velocity, future predicted position, and target classification characteristics can be computed for each track. In this algorithm, multiple targets (e.g., multiple fingers, hands, body parts, etc.) can be tracked.

A template matching algorithm can also be used for active part localization. Template matching is find objects in an image (e.g., fingers, hands, etc.) which match a template image. Template matching can be subdivided between two approaches: feature-based and global matching. The feature-based approach uses the features of the search and template image, such as edges or corners, as the primary match-measuring metrics to find the best matching location of the template in the source image. The global approach, uses the entire template, with generally a sum-comparing metric (e.g., cross-correlation) that determines the best location by testing all or a sample of the viable test locations within the search image that the template image may match up to.

If the template image has strong features, a feature-based approach may be considered; the approach may prove further useful if the match in the search image might be transformed in some fashion. Since this approach does not consider the entirety of the template image, it can be more computationally efficient when working with source images of larger resolution, as the alternative approach, template-based, may require searching potentially large amounts of points in order to determine the best matching location.

For templates without strong features, or for when the bulk of the template image constitutes the matching image, a template-based approach may be effective. Template-based template matching can use a sampling of a large number of points. It is possible to reduce the number of sampling points by reducing the resolution of the search and template images by the same factor and performing the operation on the resultant downsized images (multiresolution, or pyramid, image processing), providing a search window of data points within the search image so that the template does not have to search every viable data point, or a combination of both.

An Iterative Closest Point (ICP) algorithm can also be used that minimize the difference between two clouds of points in an image. Such an ICP algorithm can be used to reconstruct two-dimensional or three-dimensional surfaces from different scans to localize active body parts. The algorithm iteratively revises the transformation (translation, rotation) needed to minimize the distance between the points of two raw scans.

It should be appreciated by those skilled in the art that the specific embodiments disclosed above may be readily utilized as a basis for modifying or designing other image processing algorithms or systems. It should also be appreciated by those skilled in the art that such modifications do not depart from the scope of the invention as set forth in the appended claims.

What is claimed is:

1. A method for providing input to a device, comprising:
   receiving multiple image information for a first predetermined space, wherein image information is received from a camera positioned substantially near a display device, wherein the camera receives light from a direction substantially perpendicular to the display device, and wherein the camera receives light from a light-bending apparatus positioned substantially near the camera so as to bend light emanating from substantially near and in front of the display device;
   displaying an image on the display device, wherein the image includes at least one predetermined area corresponding to at least one predetermined input;
   identifying at least one active part from the image information;
   receiving depth cue information for the at least one active part;
   identifying a three-dimensional gesture of the at least one active part;
   generating action information for the at least one active part in the first predetermined space based on the identified three-dimensional gesture when the at least one active part is determined to be substantially close to at least one of the at least one predetermined areas, wherein the action information includes depth of field information for the at least one active part, and wherein the action information includes at least one of the at least one predetermined input;
   performing a predetermined computing action based on the generated action information.

2. The method of claim 1, further including performing a predetermined operation responsive to the identified three-dimensional gesture.

3. The method of claim 1, wherein the method is performed in real-time.

4. The method of claim 1, wherein substantially close to at least one of the at least one predetermined areas includes touching at least one of the at least one predetermined areas.

5. The method of claim 1, wherein predetermined space is a space above a keyboard.

6. The method of claim 1, wherein the first predetermined space is a space between a user and a display device.

7. The method of claim 1, further comprising mapping the first predetermined space to a second predetermined space.

8. The method of claim 7, wherein the second predetermined space corresponds to the display device.

9. The method of claim 1, wherein the active part includes a hand.

10. The method of claim 1, wherein the active part includes a fingertip.

11. The method of claim 1, wherein the active part includes a prop.

12. The method of claim 1, wherein a multiple gesture hypothesis is implemented.

13. The method of claim 1, wherein the at least one active part includes multiple parts of a human body.

14. The method of claim 1, wherein the at least one active part includes a upper body part.

15. The method of claim 1, wherein the light-bending apparatus is chosen form a group including a mirror or prism.

16. The method of claim 1, wherein the three-dimensional gesture initiates further identification of three-dimensional gestures.

17. The method of claim 1, wherein the three-dimensional gesture is a finger movement.

18. The method of claim 1, wherein the three-dimensional gesture is a hand movement.

19. The method of claim 1, wherein the multiple image information is video information.

20. A system for providing input to a device, comprising:
a computer system;
a camera configured to receive image information from predetermined part in a predetermined space;
a display device;
wherein the computer system is configured to:
receive multiple image information for a first predetermined space, wherein image information is received from the camera positioned substantially near the display device, wherein the camera receives light from a direction substantially perpendicular to the display device, and wherein the camera receives light from a light-bending apparatus positioned substantially near the camera so as to bend light emanating from substantially near and in front of the display device;
display an image on the display device, wherein the image includes at least one predetermined area corresponding to at least one predetermined input;
identify at least one active part from the image information;
receive depth cue information for the at least one active part;
identifying a three-dimensional gesture of the at least one active part;
generate action information for the at least one active part in the first predetermined space for the at least one active part in the first predetermined space based on the identified three-dimensional gesture when the at least one active part is determined to be substantially close to at least one of the at least one predetermined areas, wherein the action information includes depth of field information for the at least one active part, and wherein the action information includes at least one of the at least one predetermined input;
perform a predetermined computing action based on the generated action information.

21. The system of claim 20, wherein the camera is a webcam.

22. The system of claim 20, wherein the camera is a time-of-flight camera.

23. The system of claim 20, wherein the camera is a stereoscopic camera.

24. The system of claim 20, wherein the first predetermined space is a space above a keyboard.

25. The system of claim 20, wherein the first predetermined space is a space between a user and a display device.

26. The system of claim 20, wherein the active part includes a prop.

27. The system of claim 20, wherein the at least one active part includes a human body part.

28. The system of claim 20, further the light bending apparatus is chosen form a group including a mirror or prism.

* * * * *